United States Patent [19]

Teeny

[11] Patent Number: 5,110,055
[45] Date of Patent: May 5, 1992

[54] METHOD AND APPARATUS FOR CLEANING THERMOPLASTIC MATERIAL FOR REUSE

[75] Inventor: Parry Teeny, Portland, Oreg.

[73] Assignee: Partek Corporation, Vancouver, Wash.

[21] Appl. No.: 587,618

[22] Filed: Sep. 20, 1990

Related U.S. Application Data

[63] Continuation of Ser. No. 333,368, Apr. 3, 1989, abandoned.

[51] Int. Cl.⁵ .................. B02C 23/18; B02C 23/20
[52] U.S. Cl. ........................... 241/15; 209/3; 209/12; 241/17; 241/19; 241/20; 241/23; 241/24
[58] Field of Search .............. 241/14, 17, 19, 23, 241/24, 47, 46.11, 46.17, 58, 38, 46.08, 48, 53, 15, 18, 20, 21; 209/3, 11, 12; 210/221.2

[56] References Cited

U.S. PATENT DOCUMENTS

| | | | |
|---|---|---|---|
| 2,593,657 | 4/1952 | Coon et al. | 241/47 |
| 2,879,005 | 3/1959 | Jarvis | 241/14 |
| 3,814,240 | 6/1974 | Laundrie | 241/23 X |
| 3,833,178 | 9/1974 | Beck | 241/46.11 X |
| 3,897,011 | 7/1975 | Gray et al. | 241/15 |
| 3,918,457 | 9/1976 | Weist | 241/46.17 |
| 4,015,781 | 4/1977 | Beck | 241/46.11 |
| 4,033,517 | 7/1977 | Weiss | 241/46.11 |
| 4,200,486 | 4/1980 | Vagac et al. | 241/14 X |
| 4,379,525 | 4/1983 | Nowicki et al. | 241/20 |
| 4,728,045 | 3/1988 | Tomaszek | 241/19 |

FOREIGN PATENT DOCUMENTS

| | | | |
|---|---|---|---|
| 2717009 | 10/1978 | Fed. Rep. of Germany | 209/3 |
| 7508737 | 1/1976 | Netherlands | 209/3 |
| 1552118 | 9/1979 | United Kingdom | 209/3 |

*Primary Examiner*—Joseph M. Gorski
*Attorney, Agent, or Firm*—Chernoff, Vihauer, McClung & Stenzel

[57] ABSTRACT

Apparatus and a method for its use in cleaning comminuted thermoplastic material for reuse in manufacture of molded plastic products. Batches of plastic including adherent label materials and adhesives are agitated by a rotor until frictionally heated to a predetermined temperature. A flow of air is used to carry away loosened labels and adhesives. A small amount of water is introduced as a spray to dissolve adhesives and soften remaining label materials further, while loosened pieces continue to be removed in a stream of air. Thereafter, remaining adherent particles are removed in an aspirator providing a multi-stage cascade through countercurrents of air, and the particle-carrying air is then cleaned in a cyclone separator.

9 Claims, 5 Drawing Sheets

METHOD AND APPARATUS FOR CLEANING THERMOPLASTIC MATERIAL FOR REUSE

This application is a continuation, of application Ser. No. 07/333,368, filed Apr. 3, 1989 and now abandoned.

BACKGROUND OF THE INVENTION

The present invention relates to cleaning of contaminants from pieces of thermoplastic materials preparatory to reuse of such materials in molding processes.

Production of thermoplastic materials from raw materials by chemical processes is somewhat expensive, and it is desirable to keep waste of the materials at a minimum. Nevertheless, imperfections in molded products, particularly blow molded bottles for use in containing consumer goods, result in a considerable amount of plastic material which manufacturers would like to be able to reuse.

A problem which often interferes with reuse of such thermoplastic material is that labels are often applied to molded bottles before it has been determined that the bottles are unacceptable, particularly where labels are applied during the process of molding the bottles. Labels may be applied by adhesives which are water soluble at elevated temperatures, by pressure sensitive adhesives, or by thermal fusion of thermoplastic labels to bottles manufactured of the same sort of plastic. When such bottles or other plastic products are rejected, the plastic must be cut into small pieces to reduce its bulk for convenient handling. These pieces cannot simply be melted and reused, however, because attached pieces of label material would plug molding equipment or cause visible imperfections in products molded from such reused plastic material.

It has previously been attempted to clean such plastic materials by washing processes using quantities of water together with detergents or other chemicals, but such processes require rinsing, dewatering, and thorough drying of the plastic before it can be used in a molding process. Additionally, such previously available water-based washing processes did not clean pieces of plastic effectively enough, and too many remaining scraps of labels or other materials might foul molding equipment, causing production delays. Furthermore, previously known methods and apparatus for cleaning plastics require and thereby contaminate significant quantities of water, placing increased demands on available water supplies.

In general, previously available washing methods of preparing plastics materials for reuse have been too costly to be economically practical, either for small scale use in a factory where molding is performed, or for larger scale use in a central location to which several molders might send plastics material resulting from rejected production. Thus, it has previously remained less expensive to use new plastic material exclusively than to reuse material from rejected products.

Previously available machines have been used to densify clean low-density thermoplastic materials such as plastic foam, film, fiber, and the like by raising the temperature of such materials through friction, to the point where small pieces of material melt together. The agglomerated pieces are then quenched by a spray of water at ambient temperatures, forming lumps which can be handled easily. Materials to be densified using such machines first have to be adequately cleaned, nevertheless, in order for the agglomerated plastic to be useful in molding.

What is still needed, therefore, is an economical method and efficient apparatus for cleaning pieces of thermoplastic materials by removing contaminants such as labels and adhesives used to attach such labels to products such as bottles. Such a method and apparatus must be capable of reliably removing all but a completely insignificant portion of such contaminants resulting from normally occurring production imperfections, at a cost which makes such cleaning and use of the cleaned plastic material economically sensible.

SUMMARY OF THE INVENTION

The present invention provides a method and apparatus for cleaning contaminated thermoplastic materials to produce a commercially useable reclaimed plastic material at a cost low enough that reclamation of such contaminated materials by using the method and apparatus of the present invention at a centrally located plastics reclamation plant is economically feasible.

In a first stage of cleaning in accordance with the present invention, pieces of comminuted thermoplastic material including contaminants such as adhesively attached paper or plastic labels are placed within a container and agitated mechanically by a rotor until the materials within the container reach a predetermined temperature as a result of friction. During such agitation, pieces of label material are mechanically knocked free from the pieces of thermoplastic material and are carried away in a stream of air. When the appropriate temperature of the material has been reached a small amount of water is sprayed into the container, where it mixes with water soluble adhesives or is absorbed by label materials, softening the labels and adhesives and freeing them from the pieces of plastic. As the temperature of the material is raised further by continued agitation, the water evaporates, and the freed adhesive materials and label materials are carried away in a stream of gas, except for a small amount of relatively small particles which may continue to adhere loosely to the surfaces of the desired pieces of thermoplastic material.

At the second stage of cleaning, these relatively small amounts of remaining contaminants are removed from the desired pieces of thermoplastic material in an aspirator. Nearly all of the small particles remaining with the thermoplastic material are removed in the aspirator by a stream of gas moving counter to the direction of the pieces of desired thermoplastic material falling downward through multiple stages of the aspirator. After passing over a tramp metal removal magnet the cleaned pieces of thermoplastic material are collected at the outlet of the aspirator, while air carrying away the contaminant particles from the aspirator is cleaned in a cyclone separator.

It is therefore a principal object of the present invention to provide an improved and economical method and apparatus for removing contaminants such as adhesively attached label material from the surfaces of pieces of thermoplastic material so that the thermoplastic material may be reused.

It is a primary feature of the present invention that it uses heat generated by friction within a container to raise the temperature of a batch of thermoplastic material being cleaned, to the point where thermoplastic adhesives melt and a small amount of water is quickly able to dissolve and carry away a great majority of remaining adhesive materials and label materials.

It is another important feature of the present invention that it provides a combination of the use of heating by friction, water softening of label material and adhesives, removal of low density contaminants in a gas stream, and the subsequent dropping of the desired pieces of material through a counter-flowing gas stream by which particles of contaminant materials can be loosened and separated efficiently and economically from desired pieces of thermoplastic material to clean the material for reuse.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
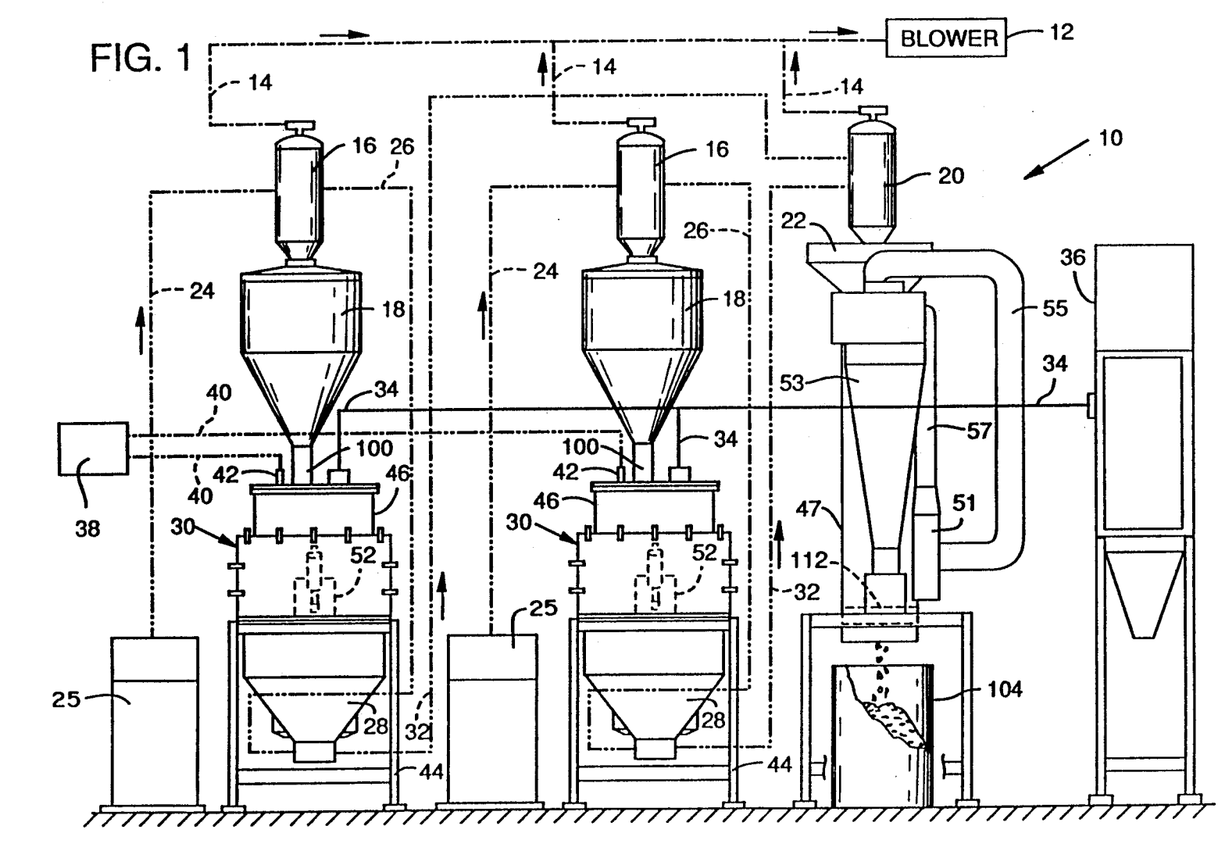
FIG. 1 is a partially schematic view of exemplary apparatus for cleaning contaminants from the surfaces of pieces of thermoplastic material according to the present invention.

Referring now to the drawings which form a part of the disclosure, in FIG. 1 a plastic cleaning system 10 according to the present invention includes a blower 12 connected to provide a stream of gas in conduits 14 in the direction indicated by arrows. The conduits 14 draw air from the top of each of a pair of inlet hoppers 16, each of which is located atop an automatic batch weigher 18. A third one of the conduits 14 is connected to a third inlet hopper 20 located atop a batch hopper 22.

A contaminated plastic inlet conduit 24 communicates between inlet hoppers 16 and respective Gaylord dumpers 25 or other receptacles for comminuted contaminated plastic pieces. Contaminated plastic recycle conduits 26 also lead into the inlet hoppers 16 from respective outlet bins 28, each associated with one of a pair of refiners 30. Also communicating with the outlet bins 28 are respective refiner outlet conduits 32 which lead to the inlet hopper 20.

A vacuum exhaust conduit 34 leads from the top of each refiner 30 to a dust collector 36. The dust collector 36 may be of a conventional type, but preferably has a filter bag of adhesion-resistant plastic or other material suitable to withstand particles of moist paper and adhesive of the types commonly used to attach labels to plastic bottles during a molding process. For satisfactory results, the dust collector should be able to pull a vacuum of 10-12 inches of water through the filter. It should have capacity to maintain at least 3000-3500 feet per minute air flow with a volume of 700 to 750 cfm through the conduits 34 to maintain adequate transport of pieces of contaminant materials in the conduits 34 and provide flow through the upper region of the refiner 30 adequate to entrain such materials. The dust collector 36 filters loose particles of label materials and adhesives from a stream of air drawn from the interior of the refiner while the contaminated material is being fed into the refiner 30. Additional material capable of being carried in a stream of air is also removed through the vacuum exhaust conduits 34 during the cleaning process which will be described in greater detail subsequently.

A water controller 38 is connected through respective conduits 40 to a respective water injection inlet 42 at the top of each of the two refiners 30, and is used to supply a small quantity of water to the interior of each refiner 30 at the appropriate times through a respective nozzle 43. The spray nozzle 43 is centrally located within the container 46 and provides a conical, downwardly directed spray of water.

Each of the refiners 30 includes a respective frame 44 supporting a container 46. The batch hopper 22 controls delivery of plastic pieces which have been processed in the refiners 30 to an aspirator 47 which separates the cleaned plastic pieces from remaining particles of label materials and adhesives not removed from the refiners 30 through the exhaust conduits 34. A fan 51 provides a flow of air through the aspirator 47 into a cyclone separator 53 through conduits 55 and 57. A suitable fan 51 is manufactured by Kice Industries, Inc. of Wichita, Kans., as its Model FC11 Industrial Fan, which may be driven by a 7.5 hp electric motor. A suitable cyclone separator 53 is also manufactured by Kice Industries, Inc., as its Model CK-30 Long Cone High Volume Separator.

Figure 2:
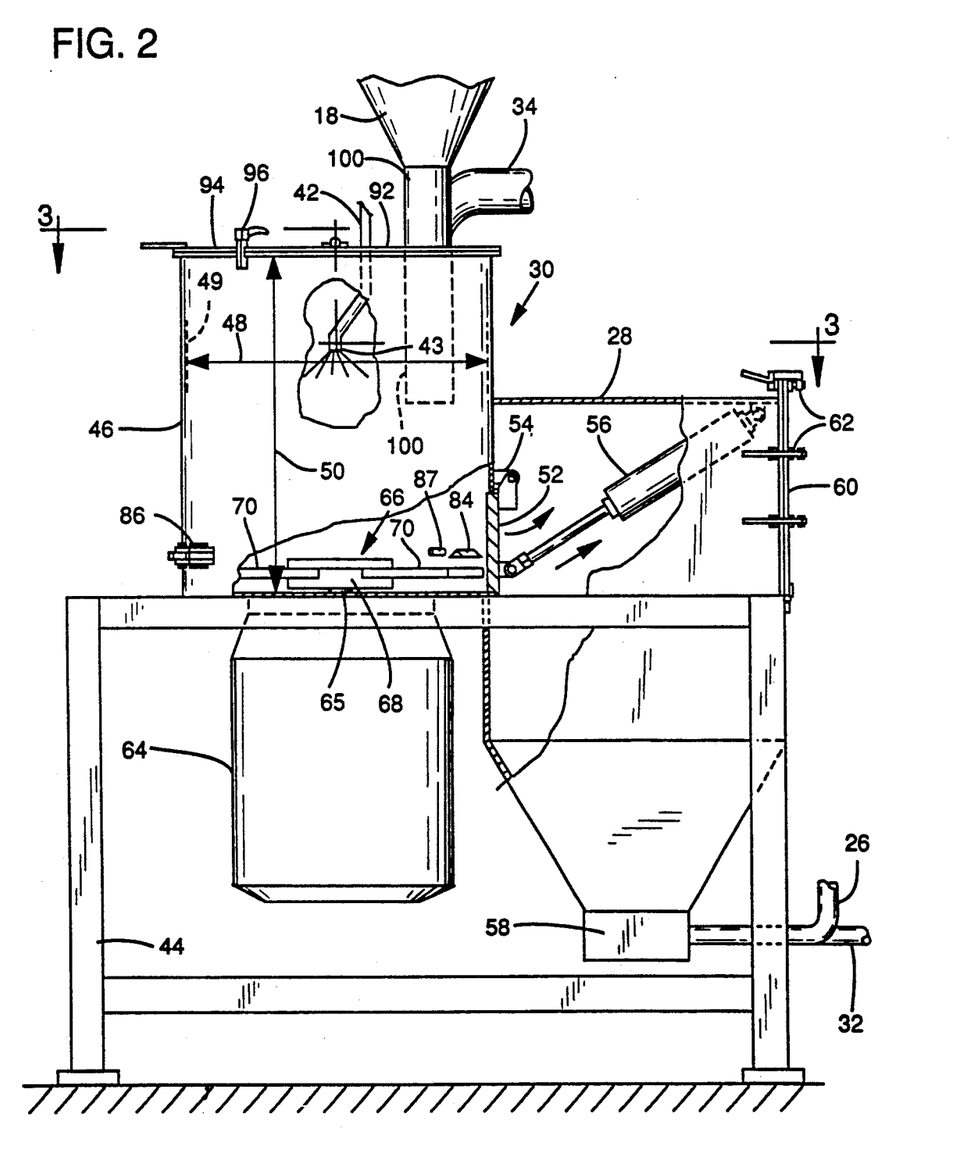
FIG. 2 is a partially cutaway side elevational view of a refiner, included in the apparatus shown in FIG. 1, for use in separating contaminants from the surfaces of pieces of thermoplastic material.
Figure 3:
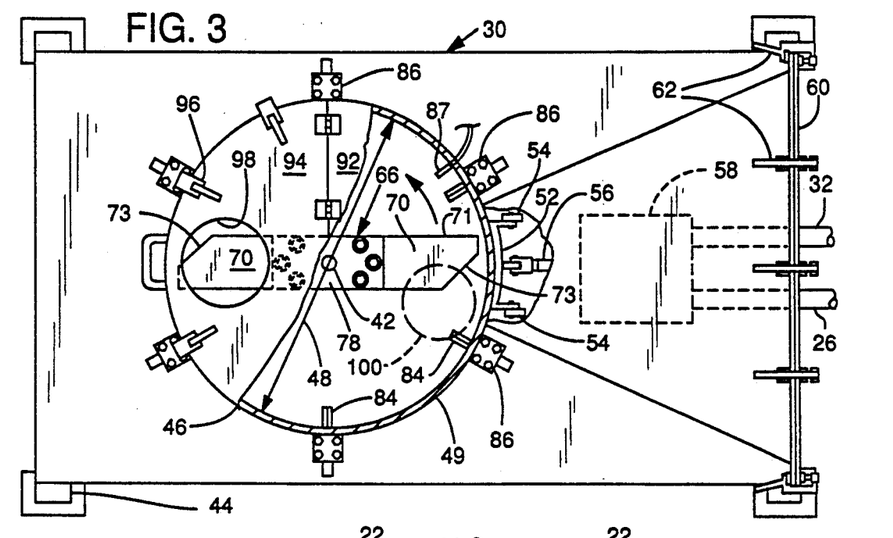
FIG. 3 is a sectional top plan view of the apparatus shown in FIG. 2, taken along line 3—3.

As may be seen in greater detail with reference to FIGS. 2 and 3, the container 46 has generally the form of an upright cylinder with an inside diameter 48 of, for example, about 35½ inches, and a vertical wall 49 having an inside height 50 of about 38178 inches. An outlet bin 28 is located at one side of the container 46 and surrounds an outlet door 52 supported by hinges 54 mounted on the exterior of the container 46. Also contained within the outlet bin 28 is a fluid-operated cylinder-and-piston assembly 56 arranged to open the door 52 selectively to permit the contents of the container 46 to flow into the outlet bin 28. The lower portion of the outlet bin 28 is tapered to a collection sump 58 to which the contaminated plastic recycle conduit 26 and the refiner outlet conduit 32 are communicatingly connected. An access door 60 permits access to the interior of the outlet bin 28, but is ordinarily held shut by quick-acting clamps 62.

Located at the bottom of the container 46 is a motor 64, for example a 125 hp three-phase, totally enclosed, fan-cooled electric motor, which operates at 1800 rpm. The motor 64 has a vertical shaft 65 which extends through an opening in the bottom of the container 46 and is drivingly connected to a rotor 66.

In a preferred embodiment of the refiner 30 the rotor 66 has a hub 68 and a pair of removable, separately replaceable blades or arms 70. As may be seen better in FIGS. 4 and 5, a lower hub member 72 is keyed to the shaft 65 of the motor 64 and fixed axially of the shaft as by one or more setscrews 74. Each of the rotor arms 70 is bolted to the lower hub member 72 by a pair of bolts 76, and a hub cover plate 78 is attached to the lower hub member 74, covering the bolts 76, by a pair of countersunk bolts 80 extending through bores in the arms 70 into a corresponding threaded bore 82 defined in the lower hub member 72.

Figure 4:
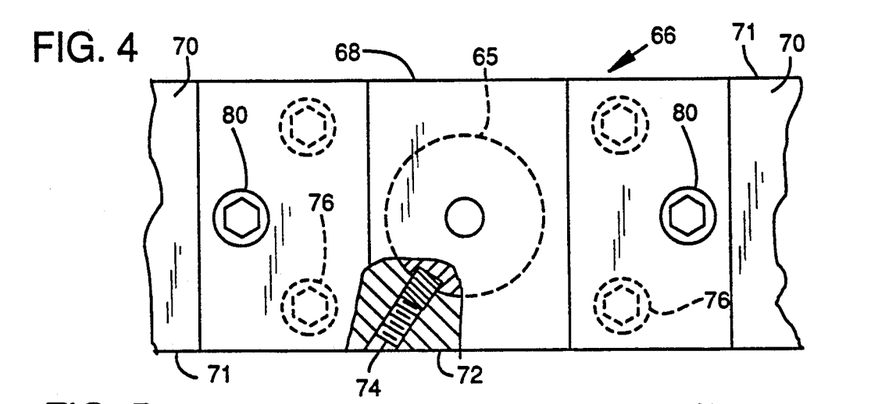
FIG. 4 is a partially cutaway top plan view of a portion of a rotor which is part of the refiner shown in FIGS. 2 and 3.
Figure 5:
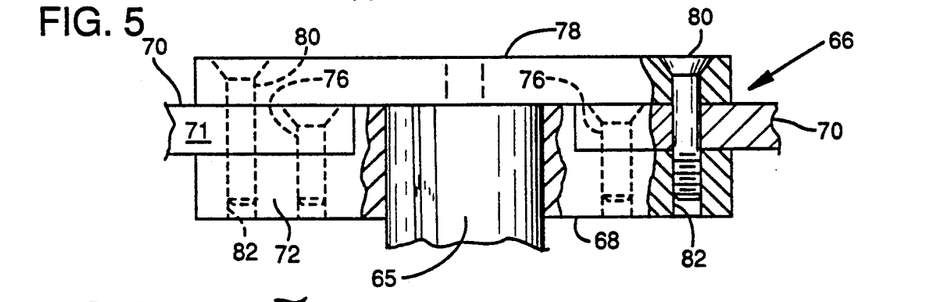
FIG. 5 is a partially cutaway front elevational view of the portion of a rotor shown in FIG. 4.

This construction of the rotor 66 permits replacement of worn rotor arms 70 with much less difficulty than would be the case if the entire rotor had to be removed from the shaft 65. Thus, downtime for replacement of worn rotor parts is greatly reduced by this construction.

Each of the rotor arms 70 has a generally flat vertical leading side 71, but the trailing side of each rotor arm is tapered, with a trailing end 73 whose surface is located at an angle of about 45° relative to the leading side 71. The leading side 71 acts as an impeller to move pieces of plastic material being cleaned, while the trailing end 73 allows pieces of plastic material to move freely and not to jam between the rotor arm 70 and the vertical wall 49.

Figure 6:
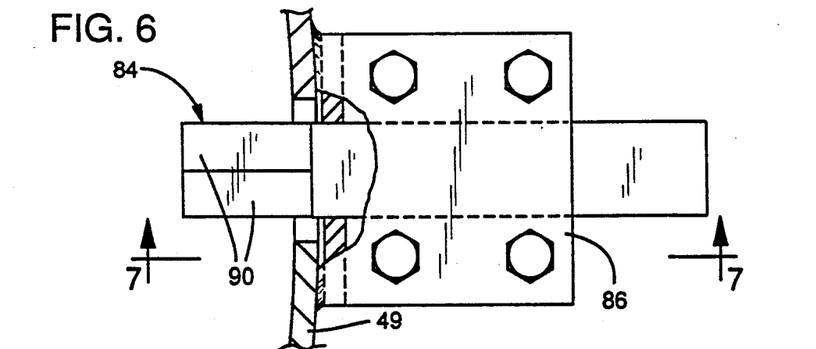
FIG. 6 is a partially cutaway fragmentary view of the container of the refiner shown in FIGS. 2 and 3, showing one of the stators.
Figure 7:
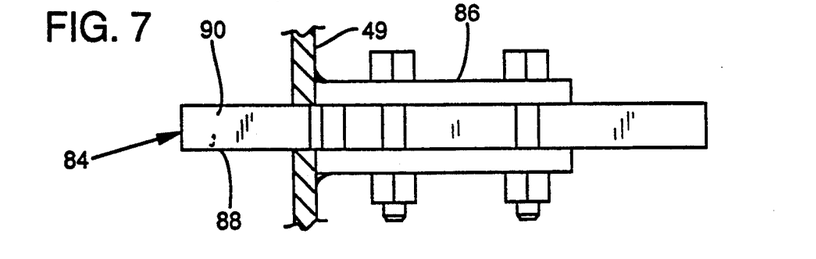
FIG. 7 is a sectional side elevational view of the part of the container and the stator shown in FIG. 6, taken along line 7—7.
Figure 8:
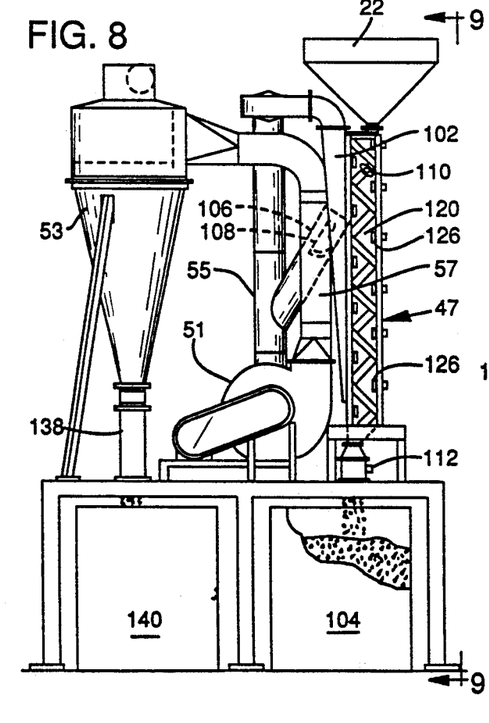
FIG. 8 is an end elevational view of an aspirator which forms a part of the apparatus shown in FIG. 1, together with an associated fan and cyclone separator.
Figure 9:
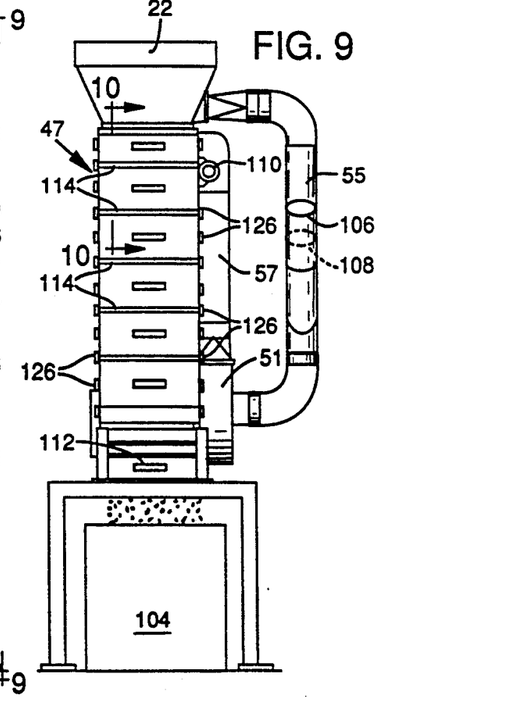
FIG. 9 is a side elevational view of the aspirator shown in FIG. 8.

Protruding inwardly through the upright cylindrical wall 49 of the container 46 are six stator blades 84, spaced equiangularly about the wall 49 and located a short distance above the height of the arms 70 of the rotor 66. For example, the stator blades 84 may advantageously be located so that the lowest portion of each stator blade 84 is about 1⅛ inch above the upper surfaces of the arms 70. Each stator blade 84 is held adjustably in a respective stator clamp 86, as shown in greater detail in FIGS. 6 and 7. The stator clamps 86 are located on the exterior side of the vertical wall 49 of the container 46, aligned with respective holes through the vertical wall 49, to hold each of the stator blades 84 securely, yet permit it to be replaced easily. Each stator blade 84 protrudes inwardly a distance of about 1¼ inches from the vertical wall 49, overlapping the rotor arms 70 by about ½ inch. A flat bottom surface 88 and a pair of inclined top surfaces 90 define the prism-like shape of each stator blade 84, so that the stator blades 84 keep movement of pieces of plastic changing during the cleaning process. A thermocouple 87 extends through the wall 49 in a location shielded by one of the stator blades 84, to provide for measurement and remote indication of the temperature of materials inside the container 46.

Referring again to FIGS. 2 and 3, at the top of the container 46, a cover plate 92 is fixedly attached about one half of the circumference of the container 46 as by clamping bolts (not shown), while a hinged cover portion 94 covers the other half of the container 46 and is ordinarily held shut by quick release clamps 96 which permit the hinged cover portion 94 to be raised easily for inspection of the interior of the container 46 and for replacement of the rotor arms 70. The hinged cover portion 94 defines a large opening 98 which permits entry of air into the container 46 to replace that removed through the vacuum exhaust conduit 34 during operation of the apparatus.

A fill pipe 100 extends downwardly from the batch weigher 18, extending through the cover 92 to about mid-height of the container 46, while the vacuum exhaust conduit 34 communicates with the interior of the container 46 through a downwardly open mouth at the height of the cover 92. For this reason, a flow of air inward through the opening 98 and outward through the vacuum exhaust conduit 34 is not likely to entrain desirable pieces of plastic material being dropped into the container 46 through the fill pipe 100, yet low-density materials such as pieces of paper label material which have been loosened and thrown upward by operation of the apparatus will be carried out of the container 46 through the vacuum exhaust conduit 34.

An aspirator 47 is shown in FIGS. 8-12. A preferred aspirator 47, such as a Model 6E24 aspirator manufactured by Kice Industries, Inc. of Wichita, Kans., includes six stages of aspiration aligned vertically one above another. All of the stages are exhausted through a single plenum 102, through which air flows upwardly and through the conduit 55 into the inlet of the fan 51, and thence through the fan and the conduit 57 to the cyclone separator 53. Desirable pieces of plastic fall downward through the aspirator 47 to be collected in a collection box 104 or other suitable container, while lighter materials are separated from the pieces of plastic within the aspirator 47 and flow through the plenum 102 into the fan 51.

A make-up air inlet pipe 106 includes a damper 108 which is variable to control admission of air into the inlet of the fan 51 to ensure that there is a sufficient volume of air flowing into the cyclone separator 53, without too much air being drawn into the aspirator 47. Too great a flow of air through the aspirator 47 might result in removal of some of the pieces of plastic which are desired to be retained. A material inlet valve 110, shown in FIG. 10, is located at the upper end of the aspirator 47 to regulate the volume of flow of pieces of plastic into the upper end of the aspirator from the batch hopper 22.

Preferably, tramp metal removal magnet 112 is located at the lower, outlet end of the aspirator 47. For example, a 6"×24" double row drawer magnet manufactured by the Bunting Company of Newton, Kans., as its HF2000 Series magnet, has been found satisfactory.

Figure 10:
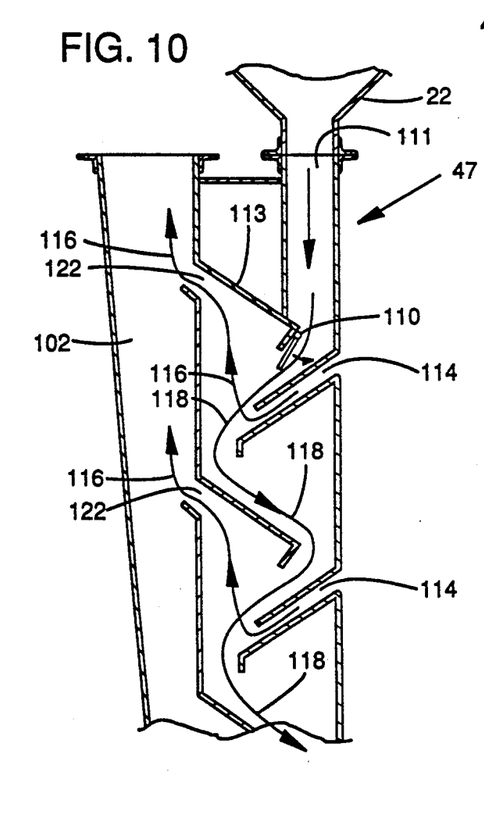
FIG. 10 is a sectional end view of an upper portion of the aspirator shown in FIGS. 7 and 8.
Figure 11:
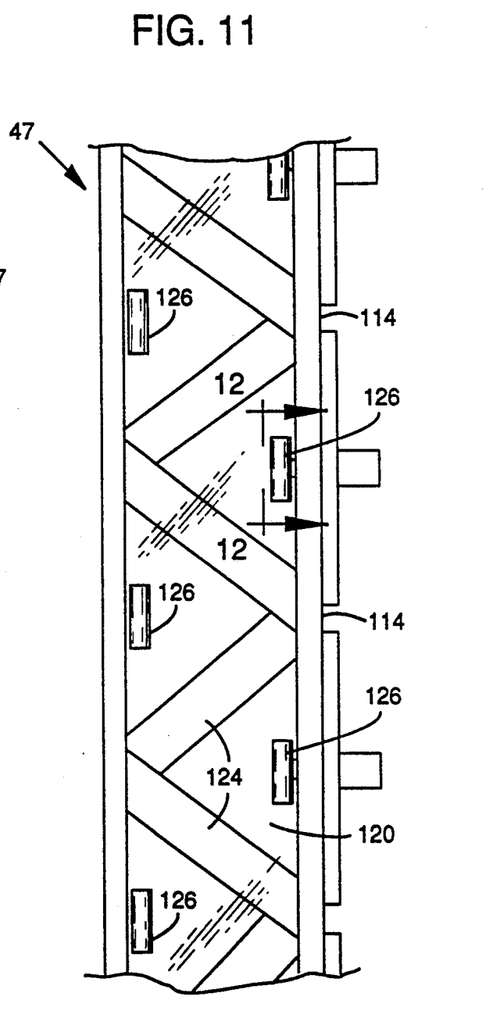
FIG. 11 is an end view of a portion of the aspirator shown in FIGS. 7 and 8.

Referring to FIG. 10, each stage of the aspirator 47 includes an inlet slot 114 through which surrounding air is drawn into the interior of the aspirator as material from the hopper 22 falls downward from stage to stage within the aspirator. Particles of lightweight material such as paper dust which have previously adhered to the desired pieces of plastic material are knocked free by the resulting cross-flow or counter-flow of air, and then are drawn upwardly along the paths indicated by the arrows 116 with the flow of air drawn through the plenum 102 and conduit 55 by the fan 51. The cleaned denser thermoplastic material flows downward as indicated by the arrows 118, to be collected in the plastic collection box 104 after passing the tramp metal removal magnet 112. The location of the infeed throat 111, with a blocking sheet 113 extending the entire distance from the plenum 102 to the lower end of the infeed throat 111, provides greater efficiency in the upper stage of the aspirator 47 than was obtained in previous designs of the aspirator.

Approximately 75 percent of the remaining less dense particulate material is removed from the larger pieces of desired plastic material in each stage of the aspirator 47, so that by six stages of cleaning in the aspirator more than 99% of the undesirable material which was present on the pieces of plastic material entering the aspirator 47 from the hopper 22 has been separated and removed by the time the cleaned pieces pass from the aspirator into the plastic collection box 104.

In order to be able to observe the progress of the pieces of plastic material from which the pieces of fine particulate material are being removed in the aspirator 47, the end plates 120 of the aspirator are of a transparent plastics material such as ⅜ inch thick plate of a polycarbonate plastic. An adequate seal is provided between each end plate 120 and the sloping internal plates which define the inlet slots 114 and the outlet slots 122 by a sealing strip of a foam material 124 (shown in FIG. 11), located between the end plates 120 and the end edges of the internal plates of the aspirator 47.

Figure 12:
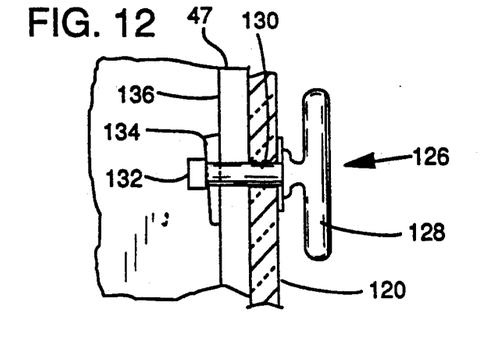
FIG. 12 is a sectional detail view, taken along line 12—12, of a portion of the aspirator shown in FIG. 11.

The transparent end plates 120 are attached to the frame of the aspirator 47 by the use of several clamps 126. The clamps 126 may be of a simple construction, including a handle 128, a shaft 130 extending through the end plate 120 in each appropriate location, a radially extending dog 132 fixedly attached to the shaft 130 for rotation therewith, and a wedge 134 mounted on the interior side of the frame member 136 of the aspirator 47, as shown in FIG. 12.

Each stage of the aspirator 47 in this embodiment of the invention has a width, the effective length of the inlet slot 114, of 24 inches. Because of the efficient sealing which is accomplished using the strips 124, the aspirator 47 according to the present invention is quite efficient, with a cleaning capacity of about 800–1500 lbs of pieces of plastic per hour per lineal foot of aspirator width.

Air which has passed through the aspirator 47 by entering the inlet slots 114 and exiting through the outlet slots 122 into the plenum 102 passes thence through the inlet conduit 55 into the fan 51. The fan 51 then delivers the air and the still-entrained particles of contaminant materials through the conduit 57 into the cyclone separator 53. Clean air exits the cyclone separator through its top, while particulate matter which has been removed from the plastic pieces in the aspirator 47 gravitates downward within the cyclone separator and exits through the outlet pipe 138 into a suitable collection box 140 located beneath the cyclone separate 53.

In accordance with the method of the present invention, quantities of contaminated plastic material such as rejected polyethylene bottles which have been comminuted are cleaned in the refiner 30 in batches. Preferably, the contaminated plastic material is conveyed pneumatically through the inlet conduit 24 from a Gaylord dumper 25 to the inlet hopper 16, which delivers the material to the batch weigher 18. The batch weigher 18 delivers a predetermined amount of contaminated plastic material, for example 250 lbs, into the container 46 through the fill pipe 100 while the rotor 66 is being rotated at a speed of 1800 rpm by the motor 64. The rotor 66 impels the pieces of plastic, keeping them moving rapidly within the container 46, colliding with each other and with the stator blades 84. This constant movement rapidly raises the temperature of the pieces of plastic and the materials carried thereon. The many collisions which occur between the rotor 66 and pieces of material and among the pieces of material within the container 46 free a great deal of the label materials from the pieces of thermoplastic material, together with much of the adhesive used originally to attach the paper to the plastic material.

When the temperature of the materials within the container 46 has increased to a predetermined temperature (preferably 140°–145° F. in the case of pieces of high density polyethelene plastic), a small amount of water, as measured by the water controller 38, is delivered through the water conduit 40 and injection inlet pipe 42 to the nozzle 43, preferably at a temperature below 50° F. The water is sprayed in a conical pattern into the interior of the container 46 within a short period, typically 10–12 seconds, while the rotor 66 continues to rotate, moving the materials within the container 46. It is important that the nozzle 43 be located centrally and provide a uniform distribution of the water delivered to the material within the container 46 in order to maintain a balance of the weight of the plastic pieces and contaminants within the container 46 and distribute the water to all the pieces of thermoplastic material being cleaned. As the water is injected into the interior of the container 46, it is rapidly absorbed by the available pieces of paper label materials and also helps to dissolve remaining amounts of water soluble adhesives which were used to attach paper labels to plastic bottles.

Continued agitation raises the temperature of the water along with the material being cleaned. Absorption and vaporization of the water cause the pieces of paper label to expand, allowing them to be beaten to a fluffy consistency and low density. These pieces are carried away from the interior of the container 46, along with the adhesives, through the vacuum exhaust conduit 34 to the dust collector 36, thus removing the vast majority of the contaminants from the desirable pieces of plastic. The dust collector then filters the pieces of paper label material and attached adhesives from the air and water vapor. Typically, nearly 90% of all pieces of paper labels and adhesive materials are removed from the desirable pieces of plastic material in this part of the process of cleaning plastic according to the present invention.

For each load processed, the processing or temperatures required and the amount of water to be injected are determined on the basis of knowledge of the type of contaminated material being processed, and relate to the amount of label material present as a fraction of the total amount of contaminated material. Thus, for a batch of plastic pieces resulting from unuseable small plastic bottles manufactured and labeled for consumer use the proportional amount of label material is likely to be greater than for plastic material resulting primarily from larger plastic bottles intended for commercial quantities of products. The amount of water required for removal of label materials and adhesives from the material derived from the commercial size bottles is therefore typically smaller. Typical amounts of water required are one to three gallons of water per batch of contaminated plastic weighing, initially, about 250 lbs, or about 3–10% by weight of the contaminated plastic material. Too little water results in failure to loosen and remove contaminants, while too much requires additional time to evaporate. Preferably, the amount of water delivered is controlled accurately by an automatic valve in the controller 38 which provides a flow of water from a pressure-regulated supply for an accurately controllable amount of time.

After addition of the water, as agitation continues the temperature rises slowly as the water is heated and evaporates. When most of the water is evaporated the temperature begins to rise more quickly, and processing in the refiner is usually complete. In any case, the processing in the refiner 30 must be stopped before the plastic melts. Thus, processing in the refiner of polyethylene is ceased when the temperature reaches about 180° F. as observed by use of the thermocouple 87.

After processing in the refiner 30 for an ample amount of time, typically about 6 to 8 minutes altogether, for a batch of polyethylene pieces originally weighing 250 lbs, the batch of originally contaminated material is emptied from the container 46 by using the cylinder and piston assembly 56 to open the outlet door 52, permitting the rotor 66 to deliver all of the material from within the container 46 into the outlet bin 28. At this stage, approximately 85-90% of the contaminants have been removed from the plastic pieces, if processing has proceeded properly.

If inspection indicates that the material has not been processed long enough, the partially cleaned pieces of plastic material may be delivered from the sump 58 through the conduit 26 to the inlet hopper 16 for reprocessing. Alternatively, for material with a high initial percentage of label and adhesive materials it is more efficient to inject water twice, in smaller amounts, with the second injection of water temporarily cooling the contents of the container 46 and dissolving or softening additional label materials and adhesive. This second injection of water may feasibly be made after the upper temperature (e.g. the 180° F. mentioned above) has been reached.

Ordinarily the material is delivered pneumatically through the conduit 32 to the inlet hopper 20 associated with the aspirator 47. The inlet hopper 20 delivers the material into the batch hopper 22. The aspirator 47 then completes separation of the remaining small particles of paper label material and adhesive material which remain adhered to the surfaces of the desirable pieces of plastic material, largely as a result of electrostatic attraction. As described previously, the aspirator 47 separates the desirable plastic material from these less dense undesirable materials, resulting in delivery of cleaned plastic pieces in which the remaining amount of contaminants is much less than 1% by weight and is typically no more than about 0.1% of the original total quantity of contaminated thermoplastic material, and the cleaned plastic pieces are satisfactory for reuse in manufacture of molded plastic products utilizing the particular type of plastic material which has been cleaned.

The method and apparatus according to the present invention have been used satisfactorily to clean contaminated polyethelene, PET, polypropylene, PVC, and ABS plastic materials to produce cleaned plastic pieces satisfactory for inclusion in batches of material to be molded.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for decontaminating thermoplastic materials, comprising the steps of:
   (a) placing into a container a quantity of contaminated material consisting essentially of pieces of thermoplastic material from molded plastic containers and contaminants adhered thereto and mixed therewith, said contaminants including as their primary constituents label materials of paper and film plastic, together with adhesives used for fastening such label materials to such pieces of thermoplastic material, said adhesives including water soluble adhesives;
   (b) mechanically agitating said contaminated material in said container until, by said agitation action, some of said contaminants are dislodged from adhesion to said pieces of thermoplastic material and the temperature of said contaminated material is elevated to a first predetermined temperature;
   (c) thereupon spraying a predetermined amount of liquid solvent at a temperature lower than that of said contaminated material into said container with said contaminated material, and absorbing a portion of said solvent in said label materials and water soluble adhesives, said predetermined amount of said solvent being no greater than about ten per cent by weight of the quantity of contaminated material;
   (d) thereafter continuing to agitate said contaminated material together with said solvent and, by said agitation action, separating more of said contaminants from adhesion to said pieces of thermoplastic material and further elevating the temperature thereof until a second predetermined temperature, higher than said first predetermined temperature, is reached and at least a majority of said contaminants are released from adherence to individual ones of said pieces of thermoplastic material without raising the temperature of said pieces of thermoplastic material high enough to cause said pieces to begin to melt;
   (e) substantially continuously withdrawing a stream of gas from said container while performing each of said steps (a), (b), (c) and (d), and carrying a majority of said released contaminants and a majority of said solvent away from said container in said stream of gas, while leaving said pieces of thermoplastic material in said container;
   (f) ceasing agitation of said pieces of thermoplastic material after said second predetermined temperature has been reached, but before the temperature of said thermoplastic pieces rises sufficiently high above said second predetermined temperature to cause said pieces to begin to melt; and
   (g) thereafter removing said pieces of thermoplastic material, which are in a relatively dry state, from said container.

2. The method of claim 1 wherein said first predetermined temperature is at least about 140° F. and said liquid solvent is water.

3. The method of claim 1 wherein said second predetermined temperature is about 180° F. and said liquid solvent is water.

4. The method of claim 1, including introducing, during step (d) thereof, a second predetermined quantity of said liquid solvent into said container after said second predetermined temperature has been reached, thereby causing cooling of said contaminated material, said quantity of solvent likewise being no greater than about ten percent by weight of the quantity of contaminated material, and thereafter continuing to carry out step (d) of claim 1.

5. The method of claim 1, including the further steps of thereafter passing said pieces of thermoplastic material together with any of said contaminants remaining therewith through an aspirator, and within said aspirator carrying a substantial portion of said remaining contaminants away from said pieces of thermoplastic material in a stream of gas.

6. The method of claim 1, including the further steps of thereafter passing said quantity of pieces of thermoplastic material and any remaining portion of said contaminants through an aspirator and therein removing substantially all of said remaining portion of said contaminants which have been released from adherence to said pieces of thermoplastic material by carrying said remaining portion of said contaminants away from said pieces of thermoplastic material in a stream of gas.

7. The method of claim 1 wherein said step of placing a quantity of contaminated material into a container includes automatically placing a quantity of contaminated material of a predetermined weight into said container.

8. The method of claim 1, including the step of comminuting said quantity of contaminated material into pieces having a predetermined maximum size prior to placing said quantity of contaminated material into said container.

9. The method of claim 1 including ceasing to agitate said material in said container during step (d) thereof when said temperature begins to increase rapidly.

* * * * *

UNITED STATES PATENT AND TRADEMARK OFFICE
CERTIFICATE OF CORRECTION

PATENT NO. : 5,110,055

DATED : May 5, 1992

INVENTOR(S) : Parry Teeny

It is certified that error appears in the above-identified patent and that said Letters Patent is hereby corrected as shown below:

Col. 4, line 55 Change "38178" to --38 1/2--.

Signed and Sealed this

Tenth Day of August, 1993

Attest:

MICHAEL K. KIRK

*Attesting Officer*     *Acting Commissioner of Patents and Trademarks*